US009566722B2

(12) United States Patent
Sitti et al.

(10) Patent No.: US 9,566,722 B2
(45) Date of Patent: Feb. 14, 2017

(54) METHOD OF MOLDING SIMPLE OR COMPLEX MICRO AND/OR NANOPATTERNED FEATURES ON BOTH PLANAR OR NON-PLANAR MOLDED OBJECTS AND SURFACES AND THE MOLDED OBJECTS PRODUCED USING SAME

(75) Inventors: Metin Sitti, Pittsburgh, PA (US); Paul Samuel Glass, Pittsburgh, PA (US); Burak Aksak, Lubbock, TX (US)

(73) Assignee: NANOGRIPTECH, INC., Pittsburgh, PA (US)

( * ) Notice: Subject to any disclaimer, the term of this patent is extended or adjusted under 35 U.S.C. 154(b) by 308 days.

(21) Appl. No.: 14/394,172

(22) PCT Filed: Apr. 13, 2012

(86) PCT No.: PCT/US2012/033583
§ 371 (c)(1),
(2), (4) Date: Oct. 13, 2014

(87) PCT Pub. No.: WO2013/154582
PCT Pub. Date: Oct. 17, 2013

(65) Prior Publication Data
US 2015/0072110 A1    Mar. 12, 2015

(51) Int. Cl.
*B29C 33/38* (2006.01)
*B29C 37/00* (2006.01)
(Continued)

(52) U.S. Cl.
CPC ......... *B29C 33/3857* (2013.01); *B29C 33/424* (2013.01); *B29C 37/0053* (2013.01);
(Continued)

(58) Field of Classification Search
CPC ..... B29C 33/3857; B29C 33/424; B29C 45/26
See application file for complete search history.

(56) References Cited

U.S. PATENT DOCUMENTS

| 6,812,990 B1 | 11/2004 | Hofmann et al. |
| 2007/0261224 A1 | 11/2007 | McLeod |
| 2010/0193997 A1 | 8/2010 | Frederickson et al. |

FOREIGN PATENT DOCUMENTS

| KR | 10-2007-0094149 A | 9/2007 |
| KR | 10-2009-0076568 A | 7/2009 |

(Continued)

OTHER PUBLICATIONS

International Search Report and Written Opinion of the ISA for PCT Applicaiton No. PCT/US2012/033583 dated Dec. 26, 2012.

*Primary Examiner* — James Sanders
(74) *Attorney, Agent, or Firm* — David G. Oberdick; Michael G. Monyok

(57) ABSTRACT

The present invention is a method that (i) allows for creating micro and/or nanostructures on either planar or non-planar three-dimensional surfaces in a single molding step, and (ii) allows for the molded production of complex high-aspect ratio micro and/or nanostructures including but not limited to cylinders, conical structures, low aspect-ratio channels, bumps, or posts. An example of such a complex structure are high aspect ratio pillars with enlarged "mushroom-shaped" or undercut tips which demonstrate enhanced, repeatable adhesion and shear strength on a variety of substrates when compared with other micro and/or nanostructures and unstructured materials. The mold of such a material requires an "undercut" feature that cannot be produced using typical micro/nano-molding processing techniques.

37 Claims, 5 Drawing Sheets

(51) Int. Cl.
  *B29C 59/02* (2006.01)
  *B29C 45/37* (2006.01)
  *B29C 33/42* (2006.01)
  *B29C 45/26* (2006.01)
  *B29L 31/00* (2006.01)
  *B29C 43/02* (2006.01)

(52) U.S. Cl.
  CPC ............ *B29C 45/26* (2013.01); *B29C 45/372* (2013.01); *B29C 59/022* (2013.01); *B29C 43/021* (2013.01); *B29C 2059/023* (2013.01); *B29L 2031/756* (2013.01); *B29L 2031/757* (2013.01); *B29L 2031/7562* (2013.01); *Y10T 428/24479* (2015.01)

(56) References Cited

FOREIGN PATENT DOCUMENTS

| | | |
|---|---|---|
| KR | 10-2011-0015304 A | 2/2011 |
| WO | 2004-002706 A2 | 1/2004 |

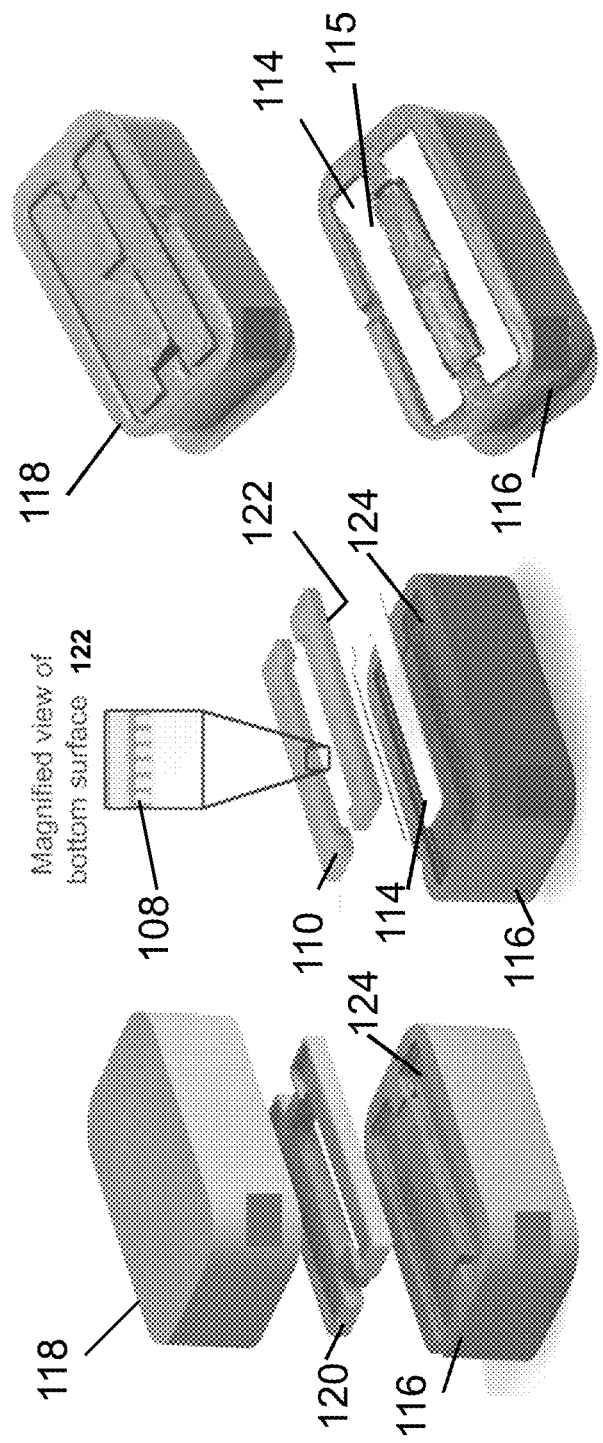

METHOD OF MOLDING SIMPLE OR COMPLEX MICRO AND/OR NANOPATTERNED FEATURES ON BOTH PLANAR OR NON-PLANAR MOLDED OBJECTS AND SURFACES AND THE MOLDED OBJECTS PRODUCED USING SAME

CROSS REFERENCE TO RELATED APPLICATIONS

The present application is a 35 U.S.C. 371 US national phase application of PCT international application s/n PCT/US2012/033583, filed on Apr. 13, 2012, and is herein incorporated by reference in its entirety.

FIELD OF THE INVENTION

The present invention is related generally to the method steps of three dimensional molding, and in particular to a process of molding simple or complex micro and/or nanopatterned features on a wide array of molded objects and both planar and non-planar surfaces. It also relates to the molded objects and surfaces resulting from these method steps as well as the molded objects produced with micro and/or nanopatterned features.

BACKGROUND OF THE INVENTION

There is a need in the current technology to incorporate simple or complex micro and/or nanoscale structures on surfaces of many different mass-produced molded parts. One example application of this invention is in the area of mass-production of solar panel clamping brackets with biologically-inspired adhesive microfibers on the glass-contacting surface to simplify the assembly of solar panel racking systems and improve their clamping ability with respect to non micropatterned alternative products. Incorporating biologically-inspired adhesive surfaces on molded parts may have a broader range of applications in the healthcare, defense, apparel, sporting good, and household good industries. For example, highly adhesive surfaces can be incorporated into the skin-contacting interfaces of sleep apnea masks or personal safety masks to improve the seal of the mask to the face and improve customer satisfaction or safety when using the products. Beyond the range of geometries of biologically-inspired fibrillar adhesives, this invention may be used to apply different micro and/or nanoscale structures to products which have applications in optics, fog resistance, pressure sensing, tissue engineering, microfluidics, and other applications known to those familiar in this field which could benefit from micro and/or nanoscale patterning.

SUMMARY OF THE INVENTION

There are two primary advantages of the present invention when compared with present technology of molding simple or complex micro and/or nanopatterned features on both planar or non-planar molded objects and surfaces. The first is that it allows for creating micro and/or nanostructures on either planar or non-planar three-dimensional surfaces in a single molding step, eliminating the need for secondary manufacturing processes after the part is removed from the mold. The second advantage is that it allows for the molded production of complex high-aspect ratio micro and/or nanostructures, not merely cylinders, conical structures, low aspect-ratio channels, bumps, or posts. An example of such a complex structure are high aspect ratio pillars with enlarged "mushroom-shaped" tips which demonstrate enhanced, repeatable adhesion and shear strength on a variety of substrates when compared with other micro and/or nanostructures and unstructured materials. The mold of such a material requires an "undercut" feature that cannot be produced using existing mass production micro/nano-molding techniques.

The present invention can be applied to fabricating micro and/or nanopatterned surfaces to enhance adhesion and friction for a variety of three dimensional injection molded products, including industrial clamps, skin contacting surfaces in the healthcare, personal safety, defense, and cosmetics industries, tissue contacting surfaces for medical device applications, materials to replace traditional "hook and loop" closures for clothing and sports apparel, athletic gloves for enhanced grip for activities like football, soccer, rock climbing, golf, and baseball. Future applications may extend beyond adhesive applications to the fabrication of micro- or nano-electronic devices, micro/nano sensors, tissue engineering scaffolds, etc.

BRIEF DESCRIPTION OF THE DRAWINGS

For the present invention to be easily understood and readily practiced, the invention will now be described, for the purposes of illustration and not limitation, in conjunction with the following figures, wherein:

FIGS. 2A-G are pictorial representations of embodiments of the present invention to fabricate a product with micro and/or nanopatterned features.

DETAILED DESCRIPTION OF THE INVENTION

Figure 1:
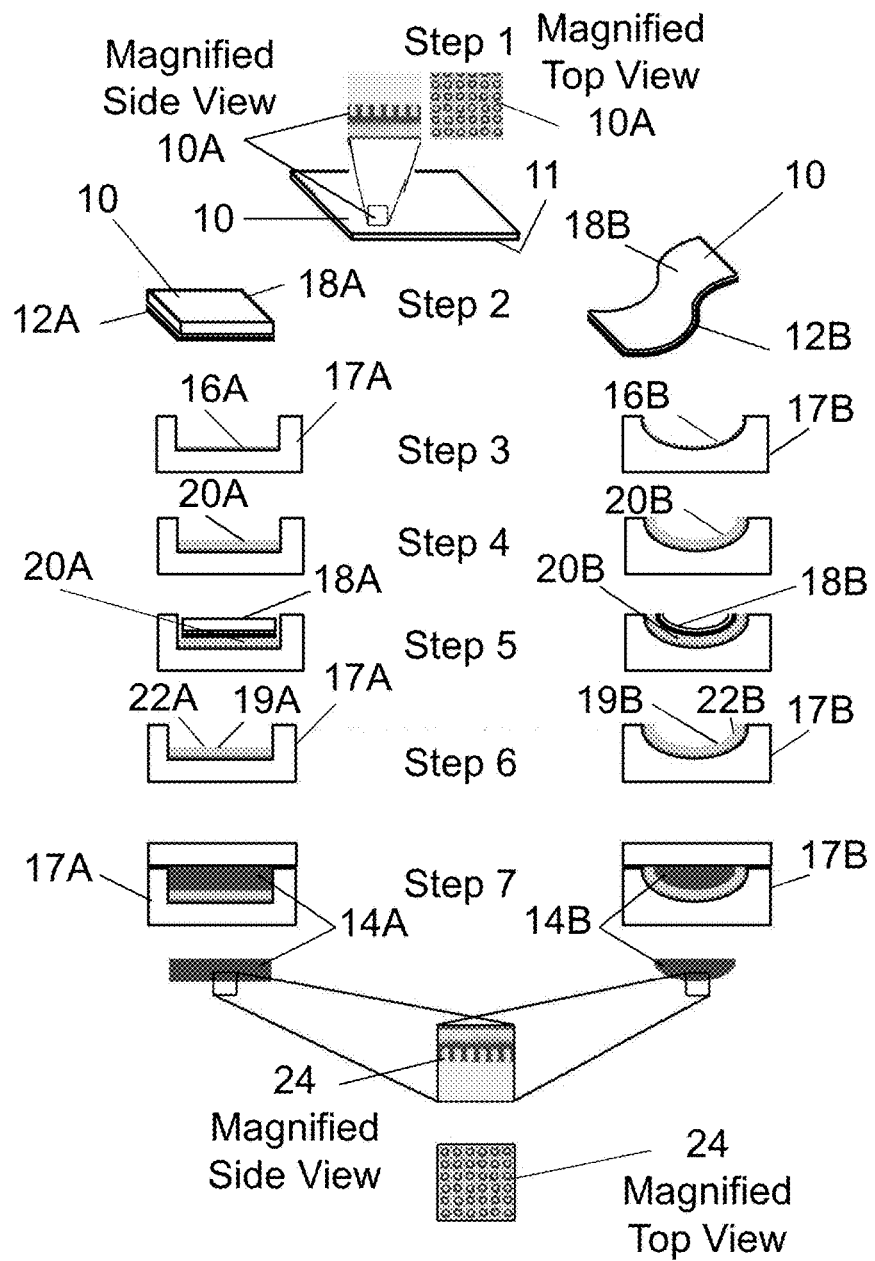
FIG. 1 are illustrations of the mold fabrication process of the present invention.

The present invention describes a process to incorporate simple or complex, three-dimensional, high aspect ratio micro and/or nanopatterned features onto surfaces of small batch or mass-produced molded parts, which includes: (1) a method for replicating micro and/or nanostructures fabricated through well-established micro/nanofabrication techniques onto thin, flexible, compliant backings; (2) a method to incorporate the patterned micro and/or nanostructures onto planar or non-planar surfaces of a molding tool with an additional surface modification molding step performed on the tool; (3) A molded part which incorporates micro and/or nanopatterned features produced using a tool modified through step (2) above. With the present invention, mass-production of injection molded parts with planar or non-planar surfaces patterned with either simple or complex, high-aspect ratio micro and/or nanostructures in a single step at extremely low cost becomes possible. Micro and/or Nanopatterned features means a cluster or grouping of multiple micro and/or nanoscale elements in a predetermined arrangement. Various patterned embodiments can be configured where adjacent sections of clustered groups can have different patterns of varying element characteristic lengths, element characteristic outer diameters, and characteristic recess or void depths and widths. The term "characteristic" refers to a representative length, diameter, depth or width where the feature may not have uniform dimensions. For example, an elliptical cross-section is non-circular but it can have a characteristic diameter determined by well known mathematical expressions.

The application refers to the following terms, words, and phrases that have particular meaning with regards to the present invention. A geometric feature being micro or microscale means that at least one of the characteristic lengths of the feature in any 3D direction should be between 0.5-500 micrometers in length. Micropatterned surfaces are surfaces which have at least one microscale feature on them. A geometric feature being nano or nanoscale means that at least one of the characteristic lengths of the feature in any 3D direction should be between 0.2-500 nanometers in length. Nanopatterned surfaces are surfaces which have at least one nanoscale feature on them. Micro and nanopatterned surfaces refer to surfaces with any combination and quantity of microscale (0.5-500 micrometers in length) and nanoscale (0.2-500 nanometers in length) features on them. The characteristic diameters of the micro and nanopatterned features can range from 0.2-500 micrometers and 0.2-500 nanometers for microscale and nanoscale features, respectively. Therefore, surfaces of the present invention can contain only microscale features, only nanoscale features, or both microscale and nanoscale features.

Though injection molding is described herein as one possible approach to manufacturing the molded part, other molding approaches include, but are not limited to, compression molding, blow molding, vacuum molding, extrusion molding, injection compression molding, extrusion compression molding, rotational molding, thermoforming, casting, pultruding, stamping, forging, or any combination thereof.

FIG. 1 shows the steps to replicate micro and/or nanostructures onto a rigid 12A or compliant 12B backing material. The first step in the process is to start with the base material 10 with actual micro and/or nanoscale features that are to be produced on molded parts 14A (on a planar molded surface), 14B (on a non-planar molded surface) using one of the molding processes described below, but not limited to:

A. Injection molding: Injection over molding, Co-injection molding, Gas assist injection molding, Tandem injection molding, Ram injection molding, Micro-injection molding, Vibration assisted molding, Multiline molding, Counter flow molding, Gas counter flow molding, Melt counter flow molding, Structural foam molding, Injection-compression molding, Oscillatory molding of optical compact disks, Continuous injection molding, Reaction injection molding (Liquid injection molding, Soluble core molding, Insert molding), and Vacuum Molding;

B. Compression molding: Transfer molding, and Insert molding;

C. Thermoforming: Pressure forming, Laminated sheet forming, Twin sheet thermoforming, and Interdigitation;

D. Casting: Encapsulation, Potting, and impregnation;

E. Coating Processes: Spray coating, Powder coatings, Vacuum coatings, Microencapsulation coatings, Electrodeposition coatings, Floc coatings, and Dip coating;

F. Blow molding: Injection blow molding, Stretch blow molding, and Extrusion blow molding;

F. Vinyl Dispersions: Dip molding, Dip coatings, Slush molding, Spray coatings, Screened inks, and Hot melts; and G. Composite manufacturing techniques involving molds: Autoclave processing, Bag molding, Hand lay up, and Matched metal compression.

The second step is to attach bottom surface 11 of starting material 10 described in step 1 onto a rigid planar backing 12A or flexible backing 12B to form product 18A, 18B, such that the actual micro and/or nanoscale features 10A are facing outward opposing the backing 12A, 12B.

The third step is to prepare planar 16A or non-planar 16B tool surface of tooling 17A, 17B using one of the methods described below, but not limited to:

A. Plasma treatment;
B. Silane adhesion promoters and coupling agents;
C. Acid etching;
D. Mechanical abrasion;
E. Chlorinated polypropylene treatment, and
F. No treatment necessary Another embodiment of the present invention includes a tool surface that is partially planar and partially non-planar (not shown).

If initial material described in step 1 is rigid and patterning is being performed on a non-planar surface, it will be necessary to first replicate it using one or more molding steps to reproduce the material with micro and/or nanoscale features from a compliant material listed below; as well as binding materials from Step 2 will also need to be compliant:

A. Thermosets:
i. Formaldehyde Resins (PF, RF, CF, XF, FF, MF, UF, MUF);
ii. Polyurethanes (PU);
iii. Unsaturated Polyester Resins (UP);
iv. Vinylester Resins (VE), Phenacrylate Resins, Vinylester Urethanes (VU);
v. Epoxy Resins (EP);
vi. Diallyl Phthalate Resins, Allyl Esters (PDAP);
vii. Silicone Resins (Si); and
viii. Rubbers: R-Rubbers (NR, IR, BR, CR, SBR, NBR, NCR, IIR, PNR, SIR, TOR, HNBR), M-Rubbers (EPM, EPDM, AECM, EAM, CSM, CM, ACM, ABM, ANM, FKM, FPM, FFKM), O-Rubbers (CO, ECO, ETER, PO), Q-(Silicone) Rubber (MQ, MPQ, MVQ, PVMQ, MFQ, MVFQ), T-Rubber (TM, ET, TCF), U-Rubbers (AFMU, EU, AU) Text, and Polyphosphazenes (PNF, FZ, PZ)

B. Thermoplastics
i. Polyolefins (PO), Polyolefin Derivates, and Copolymers: Standard Polyethylene Homo- and Copolymers (PE-LD, PE-HD, PE-HD-HMW, PE-HD-UHMW, PE-LLD); Polyethylene Derivates (PE-X, PE+PSAC); Chlorinated and Chloro-Sulfonated PE (PE-C, CSM); Ethylene Copolymers (ULDPE, EVAC, EVAL, EEAK, EB, EBA, EMA, EAA, E/P, EIM, COC, ECB, ETFE; Polypropylene Homopolymers (PP, H-PP)
ii. Polypropylene Copoplymers and -Derivates, Blends (PP-C, PP-B, EPDM, PP+EPDM)
iii. Polybutene (PB, PIB)
iv. Higher Poly-α-Olefins (PMP, PDCPD)
v. Styrene Polymers: Polystyrene, Homopolymers (PS, PMS); Polystyrene, Copoplymers, Blends; Polystyrene Foams (PS-E, XPS)
vi. Vinyl Polymers: Rigid Polyvinylchloride Homopolymers (PVC-U); Plasticized (Soft) Polyvinylchloride (PVC-P); Polyvinylchloride: Copolymers and Blends; Polyvinylchloride: Pastes, Plastisols, Organosols; Vinyl Polymers, other Homo- and Copolymers (PVDC, PVAC, PVAL, PVME, PVB, PVK, PVP)
vii. Fluoropolymers: FluoroHomopolymers (PTFE, PVDF, PVF, PCTFE); Fluoro Copolymers and Elastomers (ECTFE, ETFE, FEP, TFEP, PFA, PTFEAF, TFEHFPVDF (THV), [FKM, FPM, FFKM])
viii. Polyacryl- and Methacryl Copolymers
ix. Polyacrylate, Homo- and Copolymers (PAA, PAN, PMA, ANBA, ANMA)
x. Polymethacrylates, Homo- and Copolymers (PMMA, AMMA, MABS, MBS)

xi. Polymethacrylate, Modifications and Blends (PMMI, PMMA-HI, MMA-EML Copolymers, PMMA+ABS Blends xii. Polyoxymethylene, Polyacetal Resins, Polyformaldehyde (POM): Polyoxymethylene Homo- and Copolymers (POM-H, POM-Cop.); Polyoxymethylene, Modifications and Blends (POM+PUR)

xiii. Polyamides (PA): Polyamide Homopolymers (AB and AA/BB Polymers) (PA6, 11, 12, 46, 66, 69, 610, 612, PA 7, 8, 9, 1313, 613); Polyamide Copolymers, PA 66/6, PA 6/12, PA 66/6/610 Blends (PA+: ABS, EPDM, EVA, PPS, PPE, Rubber); Polyamides, Special Polymers (PA NDT/INDT [PA 6-3-t], PAPACM 12, PA 6-I, PA MXD6 [PARA], PA 6-T, PA PDA-T, PA 6-6-T, PA 6-G, PA 12-G, TPA-EE); Cast Polyamides (PA 6-C, PA 12-C); Polyamide for Reaction Injection Molding (PA-RIM); Aromatic Polyamides, Aramides (PMPI, PPTA)

xiv. Aromatic (Saturated) Polyesters: Polycarbonate (PC); Polyesters of Therephthalic Acids, Blends, Block Copolymers; Polyesters of Aromatic Diols and Carboxylic Acids (PAR, PBN, PEN)

xv. Aromatic Polysulfides and Polysulfones (PPS, PSU, PES, PPSU, PSU+ABS): Polyphenylene Sulfide (PPS); Polyarylsulfone (PSU, PSU+ABS, PES, PPSU)

xvi. Aromatic Polyether, Polyphenylene Ether, and Blends (PPE): Polyphenylene Ether (PPE); Polyphenylene Ether Blends xvii. Aliphatic Polyester (Polyglycols) (PEOX, PPDX, PTHF)

xviii. Aromatic Polyimide (PI): Thermosetting Polyimide (PI, PBMI, PBI, PBO, and others); Thermoplastic Polyimides (PAI, PEI, PISO, PMI, PMMI, PESI, PARI);

xix. Liquid Crystalline Polymers (LCP)

xx. Ladder Polymers: Two-Dimensional Polyaromates and -Heterocyclenes: Linear Polyarylenes; Poly-p-Xylylenes (Parylenes); Poly-p-Hydroxybenzoate (Ekonol); Polyimidazopyrrolone, Pyrone; Polycyclone xxi. Biopolymers, Naturally Occurring Polymers and Derivates: Cellulose- and Starch Derivates (CA, CTA, CAP, CAB, CN, EC, MC, CMC, CH, VF, PSAC); 2 Casein Polymers, Casein Formaldehyde, Artificial Horn (CS, CSF); Polylactide, Polylactic Acid (PLA); Polytriglyceride Resins (PTP®); xix. Photodegradable, Biodegradable, and Water Soluble Polymers;

xxii. Conductive/Luminescent Polymers;

xxiii. Aliphatic Polyketones (PK);

xxiv. Polymer Ceramics, Polysilicooxoaluminate (PSIOA);

xxv. Thermoplastic Elastomers (TPE): Copolyamides (TPA), Copolyester (TPC), Polyolefin Elastomers (TPO), Polystyrene Thermoplastic Elastomers (TPS), Polyurethane Elastomers (TPU), Polyolefin Blends with Crosslinked Rubber (TPV), and Other TPE, TPZ; and xxvi. Other materials known to those familiar with the art The fourth step is to add liquid tool insert material 20A, 20B (see possible materials in listed above for step 3 to planar 16A or non-planar 16B tool surface.

The fifth step is to press the product 18A, 18B of Step 2 into tool insert material 20A, 20B of Step 4 and allow to cure.

The sixth step is to remove product 18A, 18B of Step 2 from tool insert material 20A, 20B for final tooling 17A, 17B which now has a mold surface 22A, 22B with the negative micro and/or nanoscale features 19A, 19B of the micro/nanoscale features 10A. Herein, a negative feature is a defined as an opposite of an actual feature, such as a recess, cavity or void in a negative mold is a negative feature of a structure that projects from a surface of an actual part or product. Whereas, a structure that projects from a surface of a negative mold is a negative feature of a recess, cavity or void in an actual part or product.

The seventh step is to mold tool 17A, 17B produced by step 6 with a moldable part material (see above materials list for step 3). The product 14A, 14B of this step is a molded part with micro and/or nanoscale features 24 on one or more planar surfaces or non-planar surfaces.

Another embodiment of the present invention includes a tool surface of the molding tool having a plurality of sections (not shown). Each section of the plurality of sections includes negative micro and/or nanopatterned features having different characteristics than an adjacent section of the plurality of sections. The different characteristics include but are not limited to a recess depth, a recess inner diameter, a projection length, and a projection outer diameter.

Another embodiment of the present invention includes a removable tool insert of the molding tool having one or more planar or non-planar surfaces where at least one of these planar or non-planar surfaces includes negative micro and/or nanopatterned features produced using steps 1-6 above. This removable tool insert can be interchanged with different tool inserts with different negative micro and/or nanopatterned features should a production run require quantities of parts with various micro and/or nanopatterned features. Alternatively, these inserts may be transferred to different production sites, or to different partners or customers without transferring or being responsible for the entire molding tool.

Figure 2D:
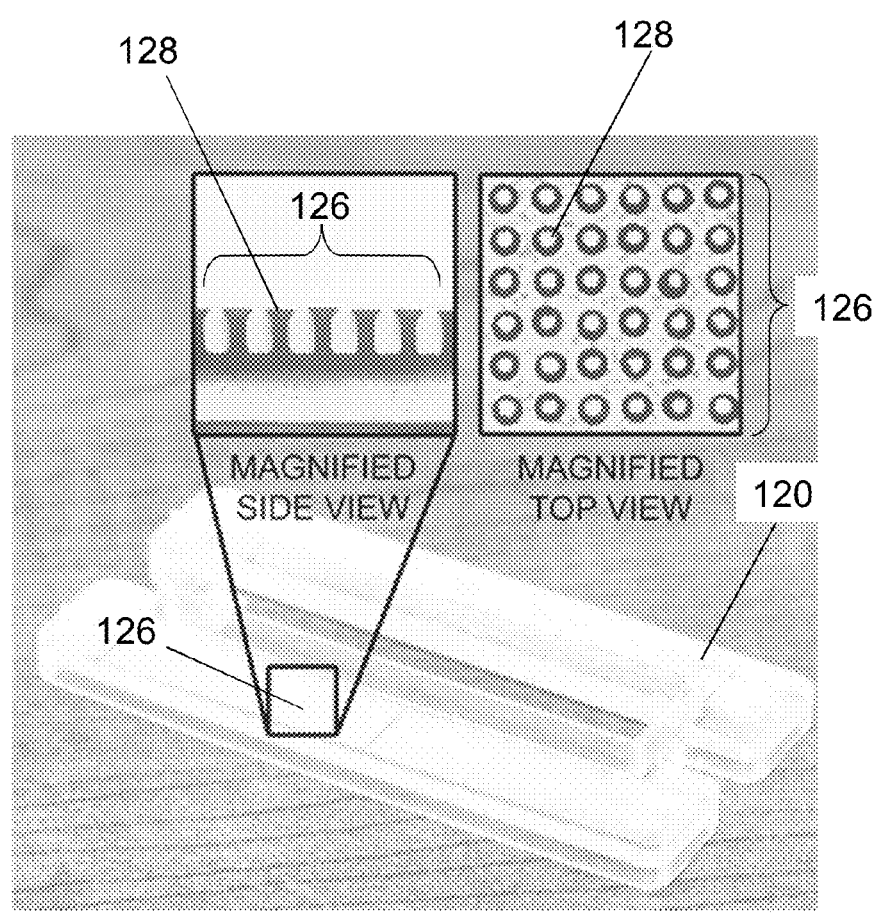

Now turning to FIGS. 2A-C illustrating the incorporation of the micro and/or nanopatterned negative mold surface 114 into an injection molding tool. An injection molding tool with the desired part geometry, such as mold part 120, can be fabricated from any existing tool manufacturing process such as but not limited to machining, rapid prototyping, or clamshell molding. FIG. 2A illustrates an injection molding tool using clamshell molding halves 116, 118 to produce molded part 120. Next, the micro and/or nanopatterned geometry 108 of master template 110 are incorporated into the micro and/or nanopatterned negative mold surface 114 using the process illustrated in FIG. 2B. The micro and/or nanopatterned negative mold surface 114 starts as a curable molding liquid such as (but not limited to) a silicone rubber or epoxy used to coat the bottom surface 124 of the bottom half of the injection molding tool 116. Additives such as (but not limited to) primers, silanes, etc., may be used to treat the coated surface 124 to improve the binding of the curable molding liquid to the bottom half of the injection molding tool 116. Next, the bottom surface 122 of master template 110 containing micro and/or nanopatterned geometry 108 is pressed into the curable molding liquid and a rigid backing holds the entire system in place as it cures. After curing, the rigid backing and bottom surface 122 are peeled from the bottom half injection molding 116 resulting in the final mold illustrated in FIG. 2C. Here, the molded surface of flexible negative mold 114 is patterned with the negative (female) micro and/or nanopatterned geometry. During molding with top half mold 118 in place, a molding liquid (not shown) is injected into cavity 115 to flow over and into flexible negative mold 114 to produce molded part 120 (see FIG. 2D). This injection molding process is able to be incorporated into large scale geometry of the tool to mass produce molded part 120 with micro and/or nanopatterned geometry 126.

Figure 2E:
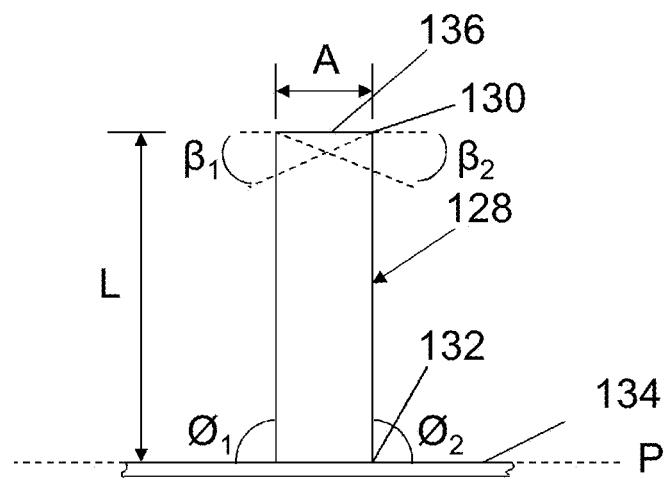
Figure 2F:
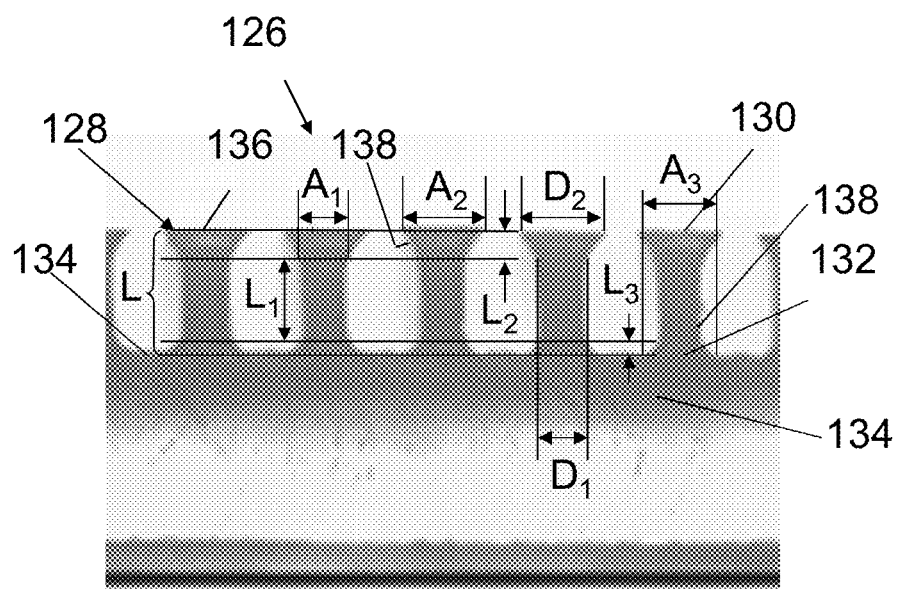
Figure 2G:
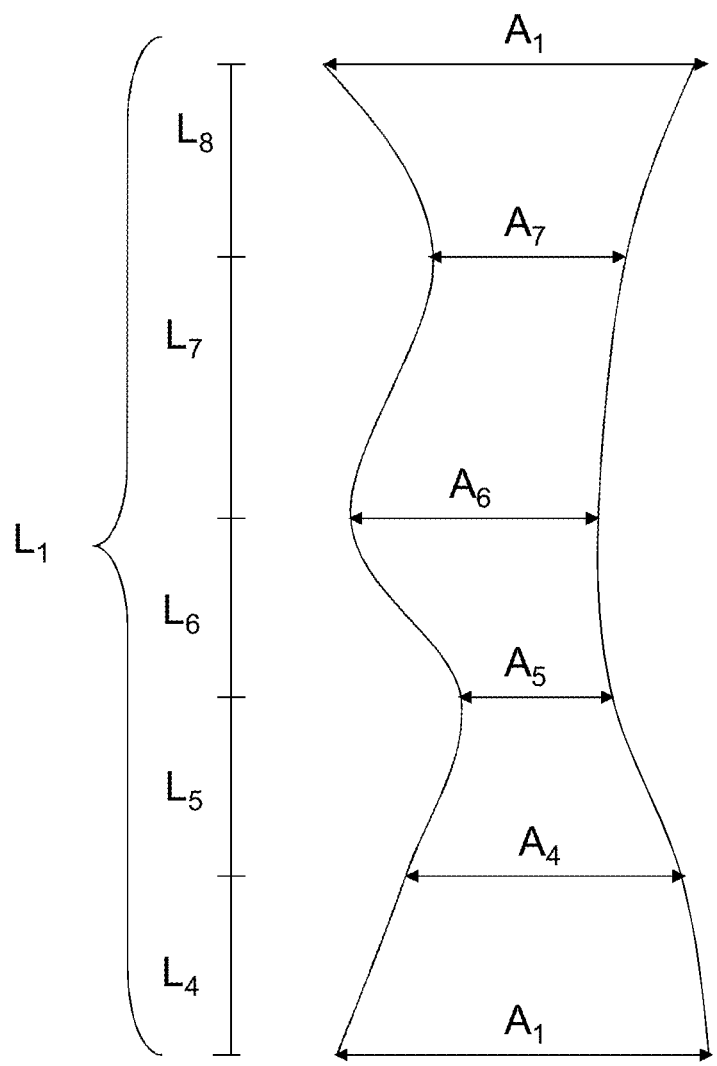

Now turning to FIGS. 2E-G that illustrate uniform and non-uniform cross-sectional areas over predetermined lengths of a replicated micro and/or nanopatterned feature 128 of replicated micro and/or nanopatterned geometry 126.

Each replicated micro and/or nanoscale feature of the plurality of replicated micro and/or nanoscale features 126 comprise a predetermined length L having (i) a replicated tip 130 at a distal end 136 of the replicated feature 128, (ii) a replicated base 132 at a proximal end 138 of the replicated feature 128, and (iii) a plurality of replicated cross-sectional areas (see below) along the replicated feature predetermined length L. FIG. 2E illustrates one embodiment of the replicated feature 128 of replicated micro and/or nanopatterned geometry 126 having a uniform (only one) cross-sectional area A along the entire length L having a replicated flat tip 130 and a replicated base 132, wherein replicated base 132 is attached to backing layer 134. FIG. 2F illustrates another replicated feature stem 128 of replicated micro and/or nanopatterned geometry 126 has a substantially uniform (only one) cross-sectional area $A_1$ over replicated feature mid-section length $L_1$, and substantially non-uniform cross-sectional Areas $A_2$ and $A_3$ over replicated fiber end lengths $L_2$ (tip transition) and $L_3$ (base transition), respectively. The present invention is not to be limited to three distinction sections (tip transition, mid-section, and base transition), but as illustrations of one possible embodiment. FIG. 2G illustrates another embodiment of the present invention can include varying cross-sectional areas ($A_4, A_5, A_6, A_7$) within length $L_1$ (corresponding to segment lengths $L_4, L_5, L_6, L_7, L_8$). The number of segments, segment lengths, and varying cross-sectional areas can be any dimension desired by the user whether the dimensions are structured based on mathematical formulas (e.g., aspect ratios) or arbitrary selections. The present invention is not to be limited to any particular numbers of sections (e.g., tip transition, mid-section, and base transition) or any particular number of varying cross-sectional areas (e.g., $A_1, A_2, A_3, A_4, A_5, A_6, A_7$), but as illustrations of possible embodiments. It should be noted that the varying cross-sectional areas can alternate between increasing and decreasing (reducing) and increasing again along length L, as shown in FIG. 2G. Another embodiment can be conically-shaped fiber with decreasing diameters from the fiber base 132 to tip 130 (not shown) or with increasing diameters from the fiber base 132 to tip 130 (not shown). Also, while the illustrations of FIGS. 2E-G illustrate replicated projecting micro and/or nanopatterned features 128, one skilled in the art will appreciate that the replicated micro and/or nanopatterned features 128 can be represented as substantially equivalent replicated recesses micro and/or nanopatterned features of negative mold 114. For example, a projected micro and/or nanopatterned feature characteristic that represents a fiber length is substantially equivalent to a recess depth for a recessed micro and/or nanopatterned feature characteristic. Another example is an outer diameter of the fiber is a replicated projected micro and/or nanopatterned feature characteristic that is substantially equivalent to an inner diameter of a replicated recess micro and/or nanopatterned feature characteristic.

The relationships between backing layer 134, replicated feature 128, and replicated tip 130 that can vary in different embodiments of the present invention. In the illustrated embodiment, replicated feature 128 can form angles $\phi_1$ and $\phi_2$ relative to a plane P parallel to backing layer 134. Similarly, replicated flat surface 136 of replicated tip 130 can form angle $\beta_1$ or $\beta_2$ relative to a plane P parallel to backing layer 134. Angles $\phi$ and $\beta$ singularly or in combination can be defined during the fabrication process. Typically, angles $\phi$ and $\beta$ can range between 0 and 180.

One skilled in the art understands that the description of the replicated micro and/or nanopatterned geometry 126 of the mass produce molded part 120 in FIGS. 2E-F are the same for the description of the actual micro and/or nanopatterned geometry 108 of the master template 110 illustrated in FIG. 2B, and actual micro and/or nanoscale features 10A of material 10 and actual micro and/or nanoscale features 24 of molded parts 14A, 14B illustrated in FIG. 1. Therefore, disclosures pertaining to micro and/or nanopatterned features or geometries apply to both actual and replicated micro and/or nanopatterned features or geometries, such that the actual micro and/or nanopatterned features of the material and the replicated micro and/or nanopatterned features of the product are substantially equivalent.

The present invention is capable of replicating the following microscale and/or nanoscale feature geometries:

A. Features which protrude from the part surface:

i. Low aspect ratio protrusions (Feature height is approximately the same or less than the feature characteristic diameter): Bumps; Pyramids; Treads (Straight treads, Curved treads, Parallel treads, Intersecting treads, Random treads); Treads with non-uniform width (Straight, curved, parallel, intersecting or random treads with one or more enlarged areas with respect to the average tread width; Straight, curved, parallel, intersecting or random treads with one or more narrowed areas with respect to the average tread width); Solid prismatic shapes with uniform cross section (Cylindrical prisms, Elliptical prisms, Rectangular prisms, Hexagonal prisms, Pentagonal prisms, Etc. (any-sided prism shape)); Solid prismatic shapes with hollow cross section; Prismatic shapes with non-uniform cross section (Enlarged prism tip shape (Spherical tip shape, Pyramidal tip shape, Spatula tip shape, Mushroom tip shape, Conical tip shape, Convex tip shape, Concave tip shape); Modified prism base shape (Narrowed base with respect to average prism diameter, Enlarged base with respect to average prism diameter); Prismatic shapes that are either enlarged or narrowed at areas that are neither the tip nor the base);

ii. High aspect ratio protrusions (Feature height is greater than the feature characteristic diameter): Treads (Straight treads, Curved treads, Parallel treads, Intersecting treads, Random treads), Treads with non-uniform width (Straight, curved, parallel, intersecting or random treads with one or more enlarged areas with respect to the average tread width; Straight, curved, parallel, intersecting or random treads with one or more narrowed areas with respect to the average tread width); Solid prismatic shapes with uniform cross section (Cylindrical prisms, Elliptical prisms, Rectangular prisms, Hexagonal prisms, Pentagonal prisms, Etc. (any-sided prism shape)); Solid prismatic shapes with hollow cross section; Prismatic shapes with non-uniform cross section (Enlarged prism tip shape (Spherical tip shape, Pyramidal tip shape, Spatula tip shape, Mushroom tip shape, Conical tip shape, Convex tip shape, Concave tip shape, Modified prism base shape (Narrowed base with respect to average prism diameter, Enlarged base with respect to average prism diameter), Prismatic shapes that are either enlarged or narrowed at areas that are neither the tip nor the base);

iii. Parts with randomly formed protrusions;

iv. Parts with other geometrical protrusions produced using micro/nanofabrication processes;

v. Parts with geometries produced using mechanical or chemical etching or abrasion processes;

vi. Parts with more than one type of micro and/or nanofeature that protrudes from the part surface: Multiple micro and/or nanofeatures at the same length scale; Multiple micro and/or nanofeatures at different length scales.

B. Features which recess into the part surface:

i. Low aspect ratio recessions (Pores, Pyramidal projections, Grooves or channels with uniform width (Straight grooves or channels, Curved grooves or channels, Parallel grooves or channels, Intersecting grooves or channels, Random grooves or channels), Grooves or channels with non-uniform width (Straight, curved, parallel, intersecting or random grooves or channels with one or more enlarged areas with respect to the average groove or channel width; Straight, curved, parallel, intersecting or random grooves or channels with one or more narrowed areas with respect to the average groove or channel width), Prismatic holes with uniform cross section (Cylindrical holes, Elliptical holes, Rectangular holes, Hexagonal holes, Pentagonal holes, Etc. (any-sided holes shape)), Hole shapes with non-uniform cross section (Enlarged hole base shape (Spherical base shape, Pyramidal base shape, Spatula base shape, Mushroom base shape, Conical base shape, Convex base shape, Concave base shape), Modified hole intersection with part surface (Narrowed base with respect to average prism diameter, Enlarged base with respect to average prism diameter), Holes that are either enlarged or narrowed at areas that are neither the tip nor the base);

ii. High aspect ratio recessions: Grooves or channels with uniform width (Straight grooves, Curved grooves, Parallel grooves, Intersecting grooves, Random grooves); Grooves or channels with non-uniform width (Straight, curved, parallel, intersecting or random grooves with one or more enlarged areas with respect to the average groove or channel width; Straight, curved, parallel, intersecting or random grooves with one or more narrowed areas with respect to the average groove or channel width); Prismatic holes with uniform cross section (Cylindrical holes, Elliptical holes, Rectangular holes, Hexagonal holes, Pentagonal holes, Etc. (any-sided holes shape)); Hole shapes with non-uniform cross section (Enlarged hole base shape (Spherical base shape, Pyramidal base shape, Spatula base shape, Mushroom base shape, Conical base shape, Convex base shape, Concave base shape); Modified hole intersection with part surface (Narrowed base with respect to average prism diameter, Enlarged base with respect to average prism diameter); Holes that are either enlarged or narrowed at areas that are neither the tip nor the base);

iii. Parts with randomly formed projections;

iv. Parts with other geometrical projections using micro and/or nanofabrication processes;

v. Parts with geometries produced using mechanical or chemical etching or abrasion processes;

vi. Parts with more than one type of micro and/or nanofeature that projects into the part surface (Multiple micro and/or nanofeatures at the same length scale, Multiple micro and/or nanofeatures at different length scales).

C. Parts with a combination of features that recess into the part surface and protrude from the part surface:

i. Multiple micro and/or nanofeatures at the same length scale;

ii. Multiple micro and/or nanofeatures at different length scales.

The present invention is capable of replicating the following undercut microscale and/or nanoscale feature geometries;

A. Features which protrude from the part surface:

i. Low aspect ratio protrusions (Feature height is approximately the same or less than the feature characteristic diameter): Treads with non-uniform width (Straight, curved, parallel, intersecting or random treads with one or more enlarged areas with respect to the average tread width; Straight, curved, parallel, intersecting or random treads with one or more narrowed areas with respect to the average tread width), Prismatic shapes with non-uniform cross section (Enlarged prism tip shape (Spherical tip shape, Pyramidal tip shape, Spatula tip shape, Mushroom tip shape (see tip 130 in FIG. 2F for illustration of a mushroom tip), Conical tip shape, Convex tip shape, Concave tip shape), Modified prism base shape (Narrowed base with respect to average prism diameter, Enlarged base with respect to average prism diameter), Prismatic shapes that are either enlarged or narrowed at areas that are neither the tip nor the base;

ii. High aspect ratio protrusions (Feature height is greater than the feature characteristic diameter): Treads with non-uniform width (Straight, curved, parallel, intersecting or random treads with one or more enlarged areas with respect to the average tread width; Straight, curved, parallel, intersecting or random treads with one or more narrowed areas with respect to the average tread width), Prismatic shapes with non-uniform cross section (Enlarged prism tip shape (Spherical tip shape, Pyramidal tip shape, Spatula tip shape, Mushroom tip shape, Conical tip shape, Convex tip shape, Concave tip shape), Modified prism base shape (Narrowed base with respect to average prism diameter, Enlarged base with respect to average prism diameter), Prismatic shapes that are either enlarged or narrowed at areas that are neither the tip nor the base);

iii. Parts with randomly formed protrusions containing undercut features;

iv. Parts with other geometrical protrusions containing undercut features produced using micro/nanofabrication processes;

v. Parts with geometries containing undercut features produced using mechanical or chemical etching or abrasion processes;

vi. Parts with more than one type of micro and/or nanofeature that protrudes from the part surface (at least one containing an undercut feature (Multiple micro and nanofeatures at the same length scale, Multiple micro and nanofeatures at different length scales).

See tip 130 in FIG. 2F for illustration of an undercut tip, where radius 138 illustrates an undercut of the tip cross-sectional area $A_2$ to stem cross-sectional area $A_1$. Cross-sectional area can also be represented by a characteristic diameter. In other words, one embodiment of the present invention includes the step of fabricating a radius 138 between the actual feature tip characteristic diameter $D_2$ and the at least one actual stem characteristic diameter $D_1$ of the plurality of actual stem characteristic diameters associated with cross-sectional areas $A_4, A_5, A_6, A_7$ of FIG. 2G to form an undercut feature.

B. Features which recess into the part surface:

i. Low aspect ratio projections: Grooves or channels with non-uniform width (Straight, curved, parallel, intersecting or random grooves or channels with one or more enlarged areas with respect to the average groove or channel width; Straight, curved, parallel, intersecting or random grooves or channels with one or more narrowed areas with respect to the average groove or channel width), Hole shapes with non-uniform cross section (Enlarged hole base shape (Spherical base shape, Pyramidal base shape, Spatula base shape, Mushroom base shape, Conical base shape, Convex base shape, Concave base shape), Modified hole intersection with part surface (Narrowed base with respect to average prism diameter, Enlarged base with respect to average prism diameter), Holes that are either enlarged or narrowed at areas that are neither the tip nor the base);

ii. High aspect ratio projections: Grooves or channels with non-uniform width (Straight, curved, parallel, intersecting or random grooves with one or more enlarged areas with respect to the average groove or channel width; Straight, curved, parallel, intersecting or random grooves with one or more narrowed areas with respect to the average groove or channel width), Hole shapes with non-uniform cross section (Enlarged hole base shape (Spherical base shape, Pyramidal base shape, Spatula base shape, Mushroom base shape, Conical base shape, Convex base shape, Concave base shape, Modified hole intersection with part surface, Narrowed base with respect to average prism diameter, Enlarged base with respect to average prism diameter), Holes that are either enlarged or narrowed at areas that are neither the tip nor the base);

iii. Parts with randomly formed projections containing undercut features;

iv. Parts with other geometrical projections containing undercut features fabricated using micro/nanofabrication processes;

v. Parts with geometries containing undercut features produced using mechanical or chemical etching or abrasion processes;

vi. Parts with more than one type of micro and/or nanofeature that recesses into the part surface, at least one of which is undercut (Multiple micro and/or nanofeatures at the same length scale, Multiple micro and/or nanofeatures at different length scales).

C. Parts with a combination of features that recess into the part surface and protrude from the part surface, at least one of which is undercut:

i. Multiple micro and/or nanofeatures at the same length scale;

ii. Multiple micro and/or nanofeatures at different length scales.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for making a negative mold having a mold surface with negative microscale and/or nanoscale patterned features on a tool surface of a molding tool to generate a molded product with replicate microscale and/or nanoscale patterned features, the method comprising the steps of:
providing a base material with actual patterned features selected from a group consisting of microscale features, nanoscale features, and microscale and nanoscale features,
providing a backing material, liquid tool insert material, and the molding tool;
attaching the base material with actual patterned features to the backing material to form a product;
adding the liquid tool insert material to the tool surface of the molding tool;
pressing the actual patterned features of the product into the liquid tool insert material and allowing the liquid tool insert material to cure; and
removing the product from the molding tool to form the negative mold having the mold surface with the negative patterned features of the actual patterned features.

2. The method according to claim 1, wherein the backing material is a rigid planar backing layer.

3. The method according to claim 1, wherein the backing material is a flexible backing layer.

4. The method according to claim 1, wherein the tool surface of the molding tool is planar.

5. The method according to claim 1, wherein the tool surface of the molding tool is non-planar.

6. The method according to claim 1, wherein the tool surface is partially planar and partially non-planar.

7. The method according to claim 1, wherein the tool surface of the molding tool further comprises a plurality of sections, wherein each section of the plurality of sections includes the negative patterned features of the actual patterned features having different characteristics than an adjacent section of the plurality of sections.

8. The method according to claim 7, wherein the different characteristics are selected from a group consisting of a characteristic recess depth, a characteristic recess inner diameter, a characteristic projection length, and a characteristic projection outer diameter.

9. The method according to claim 1, wherein the actual patterned features comprise a plurality of actual features, wherein each actual features of the plurality of actual features comprise a predetermined actual feature characteristic length and only one actual feature characteristic diameter along the predetermined actual feature characteristic length.

10. The method according to claim 1, wherein the actual patterned features comprise a plurality of actual features, wherein each actual feature of the plurality of actual features comprise an actual feature of predetermined actual feature characteristic length having (i) an actual tip at a distal end, (ii) an actual base at a proximal end, and (iii) a plurality of actual characteristic diameters along the actual predetermined actual characteristic length.

11. The method according to claim 10, wherein at least one actual feature characteristic diameter of the plurality of actual feature characteristic diameters between the actual feature base and the actual feature tip is less than an actual feature base characteristic diameter of the actual feature base and less than an actual feature tip characteristic diameter of the actual feature tip.

12. The method according to claim 11, further comprising a radius between the actual feature tip characteristic diameter and the at least one actual stem characteristic diameter of the plurality of actual stem characteristic diameters to form an undercut feature.

13. The method according to claim 1, further comprising a step of adding moldable part material to the negative mold with negative patterned features of the actual patterned features to generate the molded product with replicated patterned surfaces of the actual patterned features.

14. The method according to claim 13, wherein the replicated patterned surfaces comprise a plurality of replicated fibers of the actual patterned features, wherein each replicated fiber of the plurality of replicated fibers comprise a predetermined replicated fiber length and only one replicated fiber diameter along the replicated fiber predetermined length.

15. The method according to claim 13, wherein the replicated patterned features comprise a plurality of replicated fibers, wherein each replicated fiber of the plurality of replicated fibers comprise a replicated stem of predetermined replicated stem length having (i) a replicated stem tip at a distal end of the replicated stem, (ii) a replicated stem base at a proximal end of the replicated stem, and (iii) a plurality of replicated stem diameters along the predetermined replicated stem length.

16. The method according to claim 15, wherein at least one replicated stem diameter of the plurality of replicated stem diameters between the replicated stem base and the replicated stem tip is less than a replicated stem base diameter of the replicated stem base and less than a replicated stem tip diameter of the replicated stem tip.

17. The method according to claim 16, further comprising a radius between the replicated stem tip diameter and the at least one replicated stem diameter of the plurality of replicated stem diameters to form an undercut feature.

18. The method according to claim 1, wherein the actual patterned features of the base material and the replicated patterned features of the product are substantially equivalent.

19. The method according to claim 1, further comprising a step of removing the mold surface with the negative patterned features from the molding tool.

20. The method according to claim 13, wherein at least one replicated patterned feature of the patterned features is undercut.

21. The method according to claim 13, wherein the replicated patterned features are nanoscale features.

22. The method according to claim 13, wherein the replicated patterned features are microscale features.

23. The method according to claim 20, wherein the undercut is selected from a group consisting of treads with non-uniform width which includes straight, curved, parallel, intersecting or random treads with one or more enlarged areas with respect to the average tread width and straight, curved, parallel, intersecting or random treads with one or more narrowed areas with respect to the average tread width; and Prismatic shapes with non-uniform cross section which include Enlarged prism tip shape including Spherical tip shape, Pyramidal tip shape, Spatula tip shape, Mushroom tip shape, Conical tip shape, Convex tip shape and Concave tip shape, Modified prism base shape including Narrowed base with respect to average prism diameter and Enlarged base with respect to average prism diameter, and Prismatic shapes that are either enlarged or narrowed at areas that are neither the tip nor the base.

24. The method according to claim 20, wherein the undercut comprises low aspect ratio protrusions.

25. The method according to claim 20, wherein the undercut comprises high aspect ratio protrusions.

26. The method according to claim 1, wherein the negative patterned features are nanoscale features.

27. The method according to claim 1, wherein the negative patterned features are microscale features.

28. The method according to claim 1, wherein the negative patterned features project out from the mold surface to form the replicated patterned features that are recessed into a molded product.

29. The method according to claim 1, wherein the negative patterned features are recessed into the mold surface to form the replicated patterned features that project out from a molded product.

30. The method according to claim 1, wherein at least one actual patterned feature of the actual patterned features is undercut.

31. The method according to claim 30, wherein the undercut is selected from a group consisting of treads with non-uniform width which includes straight, curved, parallel, intersecting or random treads with one or more enlarged areas with respect to the average tread width and straight, curved, parallel, intersecting or random treads with one or more narrowed areas with respect to the average tread width; and Prismatic shapes with non-uniform cross section which include Enlarged prism tip shape including Spherical tip shape, Pyramidal tip shape, Spatula tip shape, Mushroom tip shape, Conical tip shape, Convex tip shape and Concave tip shape, Modified prism base shape including Narrowed base with respect to average prism diameter and Enlarged base with respect to average prism diameter, and Prismatic shapes that are either enlarged or narrowed at areas that are neither the tip nor the base.

32. The method according to claim 30, wherein the undercut comprises low aspect ratio protrusions.

33. The method according to claim 30, wherein the undercut comprises high aspect ratio protrusions.

34. The method according to claim 13, wherein each replicated patterned feature of the replicated patterned features comprise a predetermined replicated patterned feature characteristic length and only one replicated patterned feature characteristic diameter along the replicated patterned feature predetermined characteristic length.

35. The method according to claim 13, wherein each replicated patterned feature of the replicated patterned features comprise a predetermined replicated patterned feature characteristic length having (i) a replicated patterned feature tip at a distal end of the replicated patterned feature, (ii) a replicated patterned feature base at a proximal end of the replicated patterned feature, and (iii) a plurality of replicated patterned feature characteristic diameters along the predetermined replicated patterned feature characteristic length.

36. The method according to claim 35, wherein at least one replicated patterned feature characteristic diameter of the plurality of replicated patterned feature characteristic diameters between the replicated patterned feature base and the replicated patterned feature tip is less than a replicated patterned feature base characteristic diameter of the replicated patterned feature base and less than a replicated patterned feature tip characteristic diameter of the replicated patterned feature tip.

37. The method according to claim 36, further comprising a radius between the replicated patterned feature tip characteristic diameter and the at least one replicated patterned feature characteristic diameter of the plurality of replicated patterned feature characteristic diameters to form an undercut feature.

* * * * *